Dec. 2, 1941.  L. BERTELE  2,264,504
VIEW FINDER
Filed Nov. 2, 1939
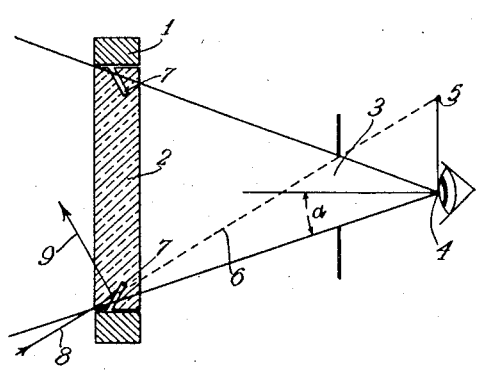
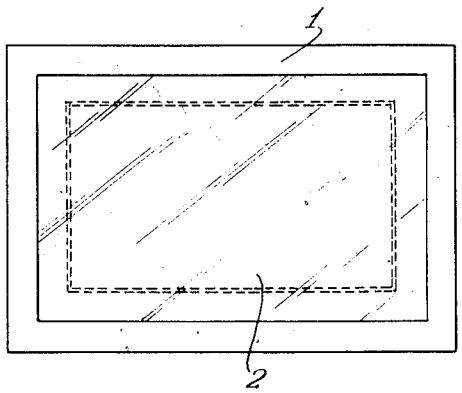
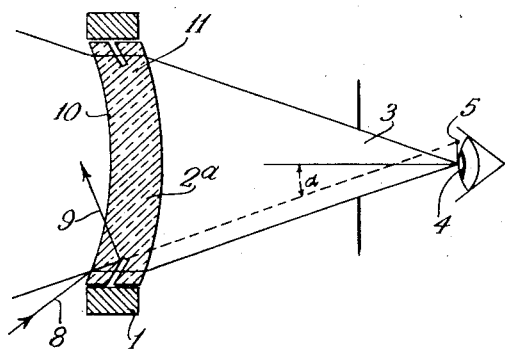
Inventor:
Ludwig Bertele
By:
Singer, Ehlert, Stern & Carlberg
Attorneys:

Patented Dec. 2, 1941

2,264,504

UNITED STATES PATENT OFFICE 2,264,504

VIEW FINDER

Ludwig Bertele, Dresden, Germany, assignor to Zeiss Ikon Aktiengesellschaft, Dresden, Germany Application November 2, 1939, Serial No. 302,520
In Germany November 18, 1938

3 Claims. (Cl. 88—1.5)

The invention relates to improvements in view finders for photographic cameras, including motion picture cameras and particularly is directed to eye level view finders.

Eye level view finders in which the image of the object appears in a frame and also view finders constructed according to a Galilean telescope in which the image of the object appears in a reduced or an enlarged scale have the fundamental disadvantage that the boundaries of the image are not very clearly visible, particularly in those cases in which the length of the view finder is short owing to the construction of the camera.

It is the principal object of the invention to overcome this disadvantage of eye level view finders by making the boundary lines clear and distinct and by making the image area of a size corresponding to the size of the image produced by the photographic objective on the film. This result is attained by providing the boundary lines with light refracting means arranged in an optically denser means, which light refracting means prevent light rays entering the finder at too great an angle from passing to the eye of the observer, by causing a total deflection of these light rays.

Another object of the invention is to provide a view finder with light refracting means comprising marginal slots cut into the glass body at the entrance of the view finder.

Still another object of the invention is to prevent any curved boundary lines of the image of the finder by making the light entrance face of the glass body concave.

In the accompanying drawing:

Figure 1 shows diagrammatically a sectional view of an eye level view finder of the invention.

Figure 2 is a front elevation view of the view finder, and

Figure 3 shows diagrammatically a sectional view of a view finder of a somewhat modified construction.

Referring to Figs. 1 and 2, the finder casing 1 is provided with a rectangular aperture in which is mounted a transparent glass plate 2. In rear of the glass plate 2 and in axial alinement with its center point is arranged the viewing aperture 3 of the finder. The pupil of the eye of the viewer is indicated at 4. The arrangement is such that the angle a indicated in the Figures 1 and 3 is equal to one-half of the largest picture angle of the camera objective for which the viewing finder is designed. It will be noted that when the pupil of the eye is in position 4 it is possible to view the entire area of the rectangular aperture in which the glass plate 2 is mounted. It is, however, possible that the pupil of the eye is shifted to a position out of axial alinement with the optical axis of the finder, for instance to the position 5. In such a case the eye would be able to look outside the picture angle as indicated by the dotted line 6.

The present invention eliminates this possibility by placing light refracting surfaces 7 in the path of the light rays of the finder next to the rectangular light entrance aperture in the casing 1. The light refracting surfaces 7 are arranged at a predetermined angle, namely at such an angle that light rays 8 which enter the finder at too great an angle will be totally reflected as indicated at 9 and thus do not pass through the finder and do not reach the eye of the viewer, regardless into which position the pupil of the eye is shifted.

The light refracting surfaces 7 are preferably formed by cutting a slot into the edge of the rectangular glass plate 2 all along the four sides thereof. The side walls of the slot are angularly inclined with respect to the faces of the glass plate 2 as clearly is shown in the Figs. 1 and 3.

When looking at the glass plate 2 from the position 4 through the viewing aperture 3 the boundary lines of the image area appear curved due to the total reflection caused by the surfaces 7. In order to prevent the appearance of curved boundary line the modification of Fig. 3 may be used. In this Fig. 3 the pupil of the eye is imaged at a great distance at the place where the total reflection takes place. This is accomplished by making the front face 10 of the glass plate 2ª concave the rear face 11 of the glass plate 2ª is then made convex in order to bring the pupil of the eye back to the original position 4.

What I claim is:

1. In a eye level view finder, a casing provided with a rectangular light admitting aperture and a viewing aperture in axial alinement with said light admitting aperture and spaced therefrom, a rectangular transparent glass plate in said light admitting aperture, and light refracting faces in said transparent glass plate and arranged at such an angle that light rays entering said light emitting aperture at an angle larger than the picture angle for which the finder is designed will be totally reflected and thus prevented from passing through the finder, said light refracting faces being formed by slots cut into the edges of said rectangular glass plate and producing a frame around the image area visible in the finder and extending to the edge of said light admitting aperture.

2. In an eye level view finder, a casing provided with a rectangular light admitting aperture and a viewing aperture in axial alinement with said light admitting aperture and spaced therefrom, a rectangular transparent glass plate in said light admitting aperture, and light refracting faces in said transparent glass plate and arranged at such an angle that light rays entering said light admitting aperture at an angle larger than the picture angle for which the finder is designed will be totally reflected and thus prevented from passing through the finder, said light refracting faces being formed by slots cut into the edges of said rectangular glass plate and producing a frame around the image area visible in the finder and extending to the edge of said light admitting aperture, the walls of said slots being arranged at an angle with respect to the outer faces of said glass plate.

3. In an eye level view finder, a casing provided with a rectangular light admitting aperture and a viewing aperture in axial alinement with said light admitting aperture and spaced therefrom, a rectangular transparent glass plate in said light admitting aperture, and light refracting faces in said transparent glass plate and arranged at such an angle that light rays entering said light admitting aperture at an angle larger than the picture angle for which the finder is designed will be totally reflected and thus prevented from passing through the finder, said light refracting faces being formed by slots cut into the edges of said rectangular glass plate and producing a frame around the image area visible in the finder and extending to the edge of said light admitting aperture, the front face of said transparent glass plate being concave to prevent the appearance of curved border lines on the image appearing in the finder.

LUDWIG BERTELE